(12) United States Patent
Cohen et al.

(10) Patent No.: US 7,889,949 B2
(45) Date of Patent: Feb. 15, 2011

(54) JOINT BILATERAL UPSAMPLING

(75) Inventors: Michael F. Cohen, Seattle, WA (US);
Matthew T. Uyttendaele, Seattle, WA (US); Daniel Lischinski, Jerusalem (IL);
Johannes Kopf, Constance (DE)

(73) Assignee: Microsoft Corporation, Redmond, WA (US)

( * ) Notice: Subject to any disclaimer, the term of this patent is extended or adjusted under 35 U.S.C. 154(b) by 960 days.

(21) Appl. No.: 11/742,325

(22) Filed: Apr. 30, 2007

(65) Prior Publication Data

US 2008/0267494 A1 Oct. 30, 2008

(51) Int. Cl.
*G06K 9/32* (2006.01)
(52) U.S. Cl. .................................. 382/299; 708/313
(58) Field of Classification Search .......... 382/299; 375/E7.099, E7.145, E7.253; 708/313
See application file for complete search history.

(56) References Cited

U.S. PATENT DOCUMENTS

| | | | |
|---|---|---|---|
| 6,002,446 A | 12/1999 | Eglit | |
| 6,184,935 B1 | 2/2001 | Iaquinto et al. | |
| 6,816,197 B2 | 12/2002 | Keshet et al. | |
| 6,510,246 B1 | 1/2003 | Boliek et al. | |
| 6,618,443 B1 | 9/2003 | Kim et al. | |
| 6,650,704 B1 | 11/2003 | Carlson et al. | |
| 7,120,305 B2 | 10/2006 | Berkner | |
| 2005/0099504 A1 | 5/2005 | Nayar et al. | |
| 2005/0244081 A1 | 11/2005 | Zhou et al. | |
| 2006/0038823 A1 | 2/2006 | Arcas | |

OTHER PUBLICATIONS

Paris, S., F. Durand, A fast approximation of the bilateral filter using a signal processing approach, Massachusetts Institute of Technology, Computer Science and Artificial Intelligence Laboratory.*
Durand, F., J. Dorsey, Fast bilateral filtering for the display of high-dynamic-range images, ACM Transactions on Graphics, 2002, vol. 21, No. 3, pp. 257-266.*
Agarwala, A., M. Dontcheva, M. Agrawala, S. Drucker, A. Colburn, B. Curless, D. Salesin, and M. Cohen, 2004, Interactive digital photomontage, ACM Transactions on Graphics vol. 23, No. 3, pp. 294-302.
Barash, D., A fundamental relationship between bilateral filtering, adaptive smoothing, and the nonlinear diffusion equation, IEEE Transactions on Pattern Analysis and Mach. Intelligence, Jun. 2002, pp. 844-847, vol. 24, No. 6.

(Continued)

*Primary Examiner*—Gregory F Cunningham
(74) *Attorney, Agent, or Firm*—Lyon & Harr, LLP; Mark A. Watson

(57) ABSTRACT

A "Joint Bilateral Upsampler" uses a high-resolution input signal to guide the interpolation of a low-resolution solution set (derived from a downsampled version of the input signal) from low-to high-resolution. The resulting high-resolution solution set is then saved or applied to the original input signal to produce a high-resolution output signal. The high-resolution solution set is close to what would be produced directly from the input signal without downsampling. However, since the high-resolution solution set is constructed in part from a downsampled version of the input signal, it is computed using significantly less computational overhead and memory than a solution set computed directly from a high-resolution signal. Consequently, the Joint Bilateral Upsampler is advantageous for use in near real-time operations, in applications where user wait times are important, and in systems where computational costs and available memory are limited.

20 Claims, 6 Drawing Sheets

OTHER PUBLICATIONS

Boykov, Y., O. Veksler, and R. Zabih, Fast approximate energy minimization via graph cuts, IEEE Transactions on Pattern Analysis and Machine Intelligence, 2001, vol. 23, No. 11, pp. 1222-1239.

Durand, F., J. Dorsey, Fast bilateral filtering for the display of high-dynamic-range images, ACM Transactions on Graphics, 2002, vol. 21, No. 3, pp. 257-266.

Eisemann, E., and F. Durand, Flash photography enhancement via intrinsic relighting, ACM Transactions on Graphics, Aug. 3, 2004, vol. 23, pp. 673-678.

Elad, M., On the origin of the bilateral filter and ways to improve it, IEEE Transactions on Image Processing, Oct. 2002, vol. 11, No. 10, pp. 1141-1151.

Fattal, R., D. Lischinski, and M. Werman, Gradient domain high dynamic range compression, Proceedings of SIGGRAPH 2002, ACM SIGGRAPH, pp. 249-256.

Levin, A., D. Lischinski, Y. Weiss, Colorization using optimization, ACM Trans. Graph., 2004, pp. 689-694, vol. 23, No. 3.

Lischinski, D., Z. Farbman, M. Uyttendaele, and R. Szelinski, Interactive local adjustment of tonal values, ACM Transactions on Graphics, pp. 646-653, vol. 25, No. 3, 2006.

Paris, S., F. Durand, A fast approximation of the bilateral filter using a signal processing approach, Massachusetts Institute of Technology, Computer Science and Artificial Intelligence Laboratory, 2006.

Petschnigg, G., R. Szeliski, M. Agrawala, M. Cohen, H. Hoppe, K. Toyama, Digital photography with flash and no-flash image pairs Proceedings of the 2004 SIGGRAPH Conference ACM Transactions on Graphics (TOG), Aug. 2004, pp. 664-672, vol. 23, No. 3.

Scharstein, D., and R. Szeliski, A taxonomy and evaluation of dense two-frame stereo correspondence algorithms, Int'l J. of Comp. Vision, Apr.-Jun. 2002, pp. 7-42, vol. 47.

Szeliski, R., Image alignment and stitching: A tutorial, Foundations and Trends® in Computer Graphics and Vision, Jan. 2006, pp. 1-104, vol. 2, No. 1.

Szeliski, R., Locally adapted hierarchical basis preconditioning, ACM Transactions on Graphics, Aug. 2006, pp. 1135-1143, vol. 25, No. 3.

Tomasi, C., and R. Manduchi, Bilateral filtering for gray and color images, Proc. of the Sixth Int'l Conf. of Comp. Vision, 1998, pp. 839-846.

Weiss, B., Fast median and bilateral filtering, Proceedings of ACM Transactions on Graphics (TOG), Jul. 2006, pp. 519-526, vol. 25, No. 3.

Yang, S., K. Hong, Bilateral interpolation filters for image size conversion, IEEE Int'l Conf. on Image Processing, ICIP 2005, Sep. 2005, pp. 986-989, vol. 2, No. 11-14.

Yatziv, L., and G. Sapiro, Fast image and video colorization using chrominance blending, IEEE Transactions on Image Processing, May 2006, pp. 1120-1129, vol. 15, No. 5.

* cited by examiner

JOINT BILATERAL UPSAMPLING

BACKGROUND

1. Technical Field

The invention is related to upsampling of signals, and in particular, to a technique for constructing a high-resolution output signal and/or or a high-resolution solution set as a bilateral function of an original input signal and a low-resolution solution set derived from a downsampled version of the original input signal.

2. Related Art

Processing high-resolution signals, such as, for example, a multi-Megapixel or Gigapixel image file, typically requires significant computational overhead and memory to compute a global solution. For example, image processing tools such as tone mapping, colorization, stereo depth, photomontage, etc., require computing a solution (e.g., exposure, chromaticity, disparity, labels, etc.) over the entire image pixel grid.

However, as the size of the signal increases, the computational costs and/or available memory often requires the desired solution to be computed by downsampling the original signal, processing the downsampled signal to achieve some desired solution, then upsampling the processed downsampled signal. This is particularly useful for interactive applications where user wait times are an important consideration.

Generally, once a low-resolution solution has been computed for the smaller downsampled signal, conventional signal processing schemes operate by convolving the low-resolution downsampled signal with an interpolation kernel, and resampling (upsampling) the result on a new (high-resolution) grid to produce a processed upsampled version of the original signal. Examples of conventional upsampling techniques include techniques such as "nearest neighbor," Gaussian interpolation, bicubic interpolation, etc.

Unfortunately, one of the problems with computing a solution over a downsampled signal is that the final upsampled solution or signal tends to include artifacts or other errors that would not exist if the full resolution signal had been processed instead of the downsampled signal. For example, images upsampled in this manner typically suffer from blurring of sharp edges due to a smoothness prior inherent in conventional linear interpolation filters.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, a "Joint Bilateral Upsampler," as described herein, operates to construct a high-resolution output signal and/or or a high-resolution solution set as a bilateral function of an original input signal and a low-resolution solution set derived from a downsampled and processed version of the original input signal. Once the high-resolution solution set has been computed, that high-resolution solution set is either saved for later use, or applied to the original high-resolution input signal to produce a high-resolution output signal. Simple examples of solution sets include: an exposure solution for a tone mapping problem; a chromaticity solution for a colorization problem; a disparity solution for a stereo depth problem (requires two or more high-resolution input images); a label solution for a photomontage or graph-cut problem; a global illumination solution for a 3D mesh model; etc.

Unlike traditional bilateral filters which operate at a single resolution, the Joint Bilateral Upsampler described herein operates as a joint bilateral function of a distance measure (spatial filter) between data points of a low-resolution solution set, and a difference (range filter) between data points of the original high-resolution input signal. As such, the Joint Bilateral Upsampler operates at two different resolutions to construct a high-resolution solution set. The joint bilateral function then outputs the high-resolution solution set which is either saved for later use, or applied to the original high-resolution input signal to produce a high-resolution output signal.

For example, in the case of image files, the Joint Bilateral Upsampler generally operates by first downsampling a high-resolution input image, processing the downsampled image to provide the desired low-resolution solution set for problems such as, for example, tone mapping, colorization, stereo depth, photomontage, etc. Once the low-resolution solution set is available, the Joint Bilateral Upsampler then constructs a high-resolution solution set as a joint bilateral function of the low-resolution solution set and the original input image.

The resulting high-resolution solution set is very close to an ideal high-resolution solution set that would be produced directly from the original high-resolution input signal without downsampling. However, since the high-resolution solution set produced by the Joint Bilateral Upsampler is constructed in part from a downsampled version of the original input signal, it is computed using significantly less computational overhead and memory than is achievable using conventional signal processing techniques. Consequently, one advantage of the Joint Bilateral Upsampler is that it is applicable for use in real-time or near real-time operations in applications where user wait times are an important consideration.

In view of the above summary, it is clear that the Joint Bilateral Upsampler described herein provides a unique system and method for processing high-resolution input signals to produce high-resolution solution sets and/or high-resolution output signals. In addition to the just described benefits, other advantages of the Joint Bilateral Upsampler will become apparent from the detailed description that follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
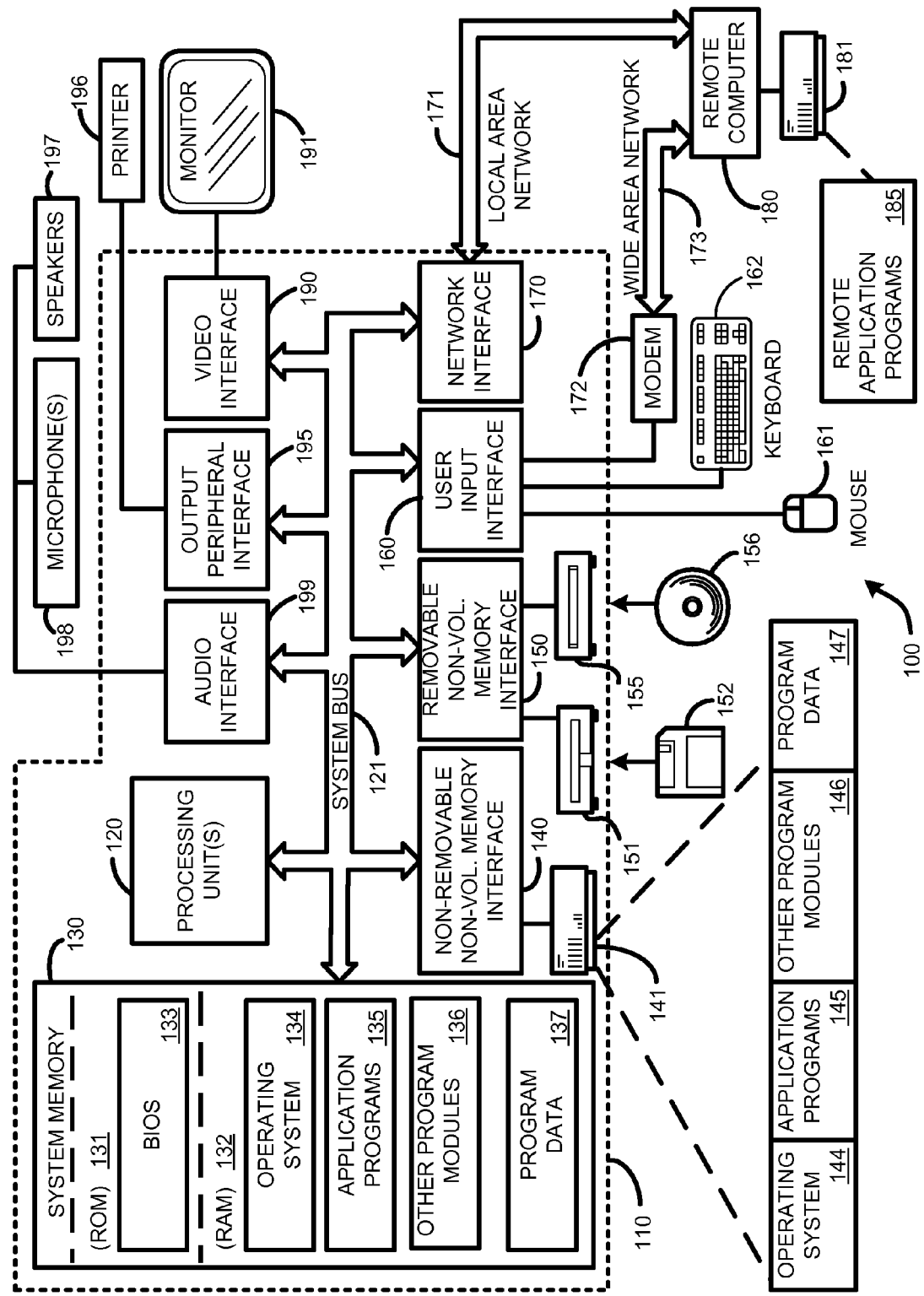
FIG. 1 is a general system diagram depicting a general-purpose computing device constituting an exemplary system for implementing a various embodiments of Joint Bilateral Upsampler, as described herein.
Figure 2:
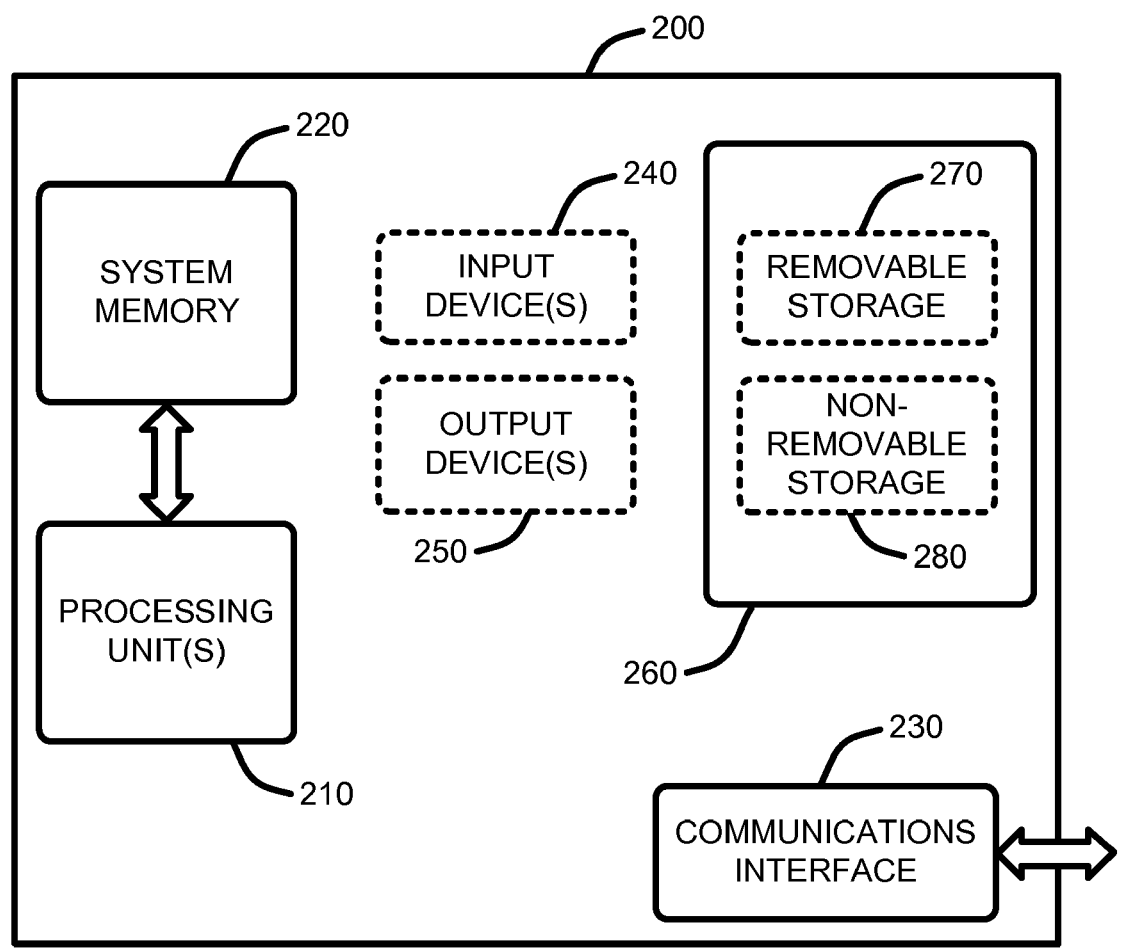
FIG. 2 is a general system diagram depicting a general computing device having simplified computing and I/O capabilities for implementing various embodiments of a Joint Bilateral Upsampler, as described herein.
Figure 3:
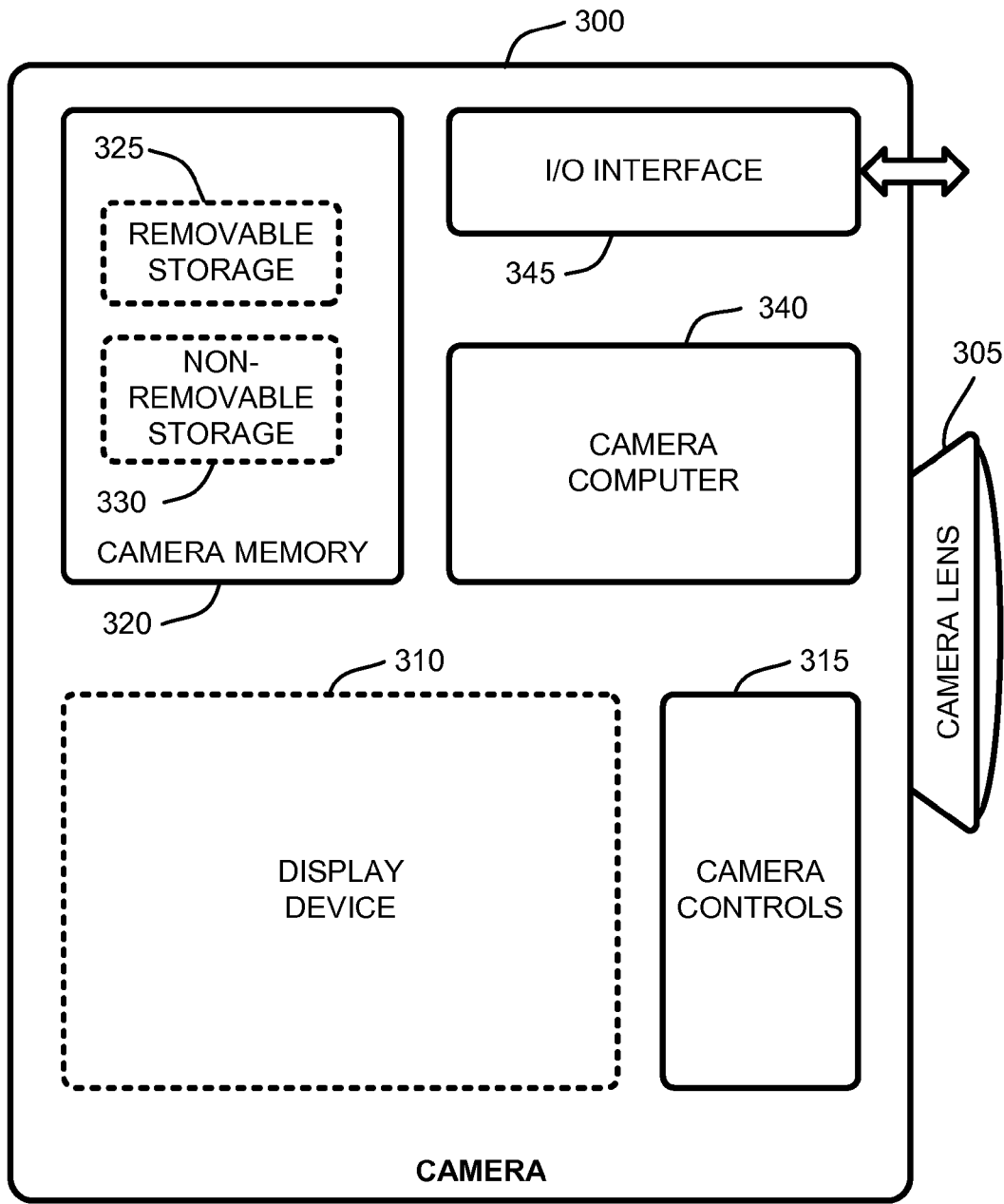
FIG. 3 is a general system diagram depicting a digital camera having integrated computing and I/O capabilities for implementing various embodiments of a Joint Bilateral Upsampler, as described herein.

1.0 Exemplary Operating Environments:

FIG. 1, FIG. 2, and FIG. 3 illustrate various examples of suitable computing environments on which various embodiments and elements of a "Joint Bilateral Upsampler," (JBU) as described herein, may be implemented.

For example, FIG. 1 illustrates an example of a general computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor 191, computers may also include other peripheral output devices such as a printer 196, which may be connected through an output peripheral interface 195.

Further, the computer 110 may also include, as an input device, one or more cameras 192 (such as a digital/electronic still or video camera, or film/photographic scanner) capable of capturing a sequence of images 193. The images 193 from the one or more cameras 192 are input into the computer 110 via an appropriate camera interface 194 using conventional wired or wireless interfaces, including, for example, USB, IEEE 1394, Bluetooth™, IEEE 802.11, etc. This interface is connected to the system bus 121, thereby allowing the images 193 to be routed to and stored in the RAM 132, or any of the other aforementioned data storage devices associated with the computer 110. However, it is noted that previously stored image data can be input into the computer 110 from any of the aforementioned computer-readable media as well, without directly requiring the use of a camera 192.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

With respect to FIG. 2, this figure shows a general system diagram showing a simplified computing device coupled to a digital camera. Such computing devices can typically be found in devices having at least some minimum computational capability in combination with a communications interface. Examples of well known simplified computing systems, environments, and/or configurations that may be suitable for use with the invention include, but are not limited to, hand-held, laptop or mobile computers, communications devices such as cell phones and PDA's, etc.

It should be noted that any boxes that are represented by broken or dashed lines in FIG. 2 represent alternate embodiments of the simplified computing device, as described herein, and that any or all of these alternate embodiments, as described below, may be used in combination with other alternate embodiments that are described throughout this document.

At a minimum, to enable a computing device to implement a "Joint Bilateral Upsampler" (as described in further detail below), the computing device 200 must have some minimum computational capability and a wired or wireless communications interface 230 for inputting one or more signals to be upsampled.

In particular, as illustrated by FIG. 2, the computational capability of the computing device 200 is generally illustrated by processing unit(s) 210 (roughly analogous to processing units 120 described above with respect to FIG. 1), and system memory 220. Note that in contrast to the processing unit(s) 120 of the general computing device of FIG. 1, the processing unit(s) 210 illustrated in FIG. 2 may be specialized (and inexpensive) microprocessors, such as a DSP, a VLIW processor, or other micro-controller rather than the general-purpose processor unit of a PC-type computer or the like, as described above.

In addition, the simplified computing device 200 of FIG. 2 may also include other components, such as, for example connections for one or more input devices 240 (analogous to the input devices described with respect to FIG. 1. The simplified computing device of FIG. 2 may also include other optional components, such as, for example one or more output devices 250 (analogous to the output devices described with respect to FIG. 1). The simplified computing device of FIG. 2 may also include removable and/or non-removable storage, 260 and 270, respectively (analogous to the storage devices described with respect to FIG. 1).

Finally, with respect to FIG. 3, this figure is a general system diagram depicting a digital camera 300 having integrated computing 340 and I/O capabilities 345, and an optional display device 310, such as an LCD screen, for implementing a Joint Bilateral Upsampler, as described herein.

In general, as is well known to those skilled in the art, conventional digital cameras include components such as those described above with respect to FIG. 1 and FIG. 2 (e.g., I/O, computing, and display), in addition to camera memory 320 that is either removable 325 or non-removable 330. Such cameras also include a lens 305 and a set of one or more controls 315. Further, as with the simplified computing device described with respect to FIG. 2, the computing capability 340 of the digital camera can be implemented using low cost specialized processors, such as a DSP, a VLIW processor, or other micro-controller rather than the general-purpose processor unit of a PC-type computer or the like, as described above with respect to FIG. 1. In various embodiments, these components are used in combination to enable the functionality of the Joint Bilateral Upsampler within a standalone digital camera.

The exemplary operating environment having now been discussed, the remaining part of this description will be devoted to a discussion of the program modules and processes embodying a "Joint Bilateral Upsampler" for priduce a high-resolution output signal from a low-resolution input signal that is constructed from a downsampled and processed version of an original high-resolution input signal.

2.0 Introduction:

In general, the Joint Bilateral Upsampler operates to construct a high-resolution output signal and/or or a high-resolution solution set as a bilateral function of an original input signal and a low-resolution solution set derived from a downsampled version of the original input signal. Once the high-resolution solution set has been computed, that high-resolution solution set is either saved for later use, or applied to the original high-resolution input signal to produce a high-resolution output signal.

With respect to signals representing images, simple examples of solution sets include: 1) an exposure solution for a tone mapping problem; 2) a chromaticity solution for a colorization problem; 3) a disparity solution for a stereo depth problem (requires two or more high-resolution input images); and 4) a label solution for a photomontage or graph-cut problem.

However, it should be noted that the upsampling capabilities described herein are applicable to upsampling problems with respect to a number of signal types other than images, including, for example, audio signals, 2D or 3D meshes or models (for use in 2D and 3D rendering problems), or any other signal type of any desired dimensionality. For example, in the case of a 3D mesh model, the solution set may represent a global illumination over the 3D mesh.

Consequently, It should be appreciated that the example solution sets noted above are provided simply for purposes of explanation, and that the joint bilateral upsampling capabilities described herein are applicable to many signal processing applications and signal types. However, for purposes of explanation, the following discussion will generally refer to the processing and upsampling of 2D images.

Further, in various embodiments, the Joint Bilateral Upsampler is implemented either within a dedicated computing device (such as illustrated with respect to FIG. 1 and FIG. 2), or within a digital still or video cameras (such as illustrated by FIG. 3). However, in each of these cases, the Joint Bilateral Upsampler described herein operates in essentially the same way. Consequently, while the Joint Bilateral Upsampler will be generally described herein as being implemented within a general computing device, it should be understood that the detailed description of the Joint Bilateral Upsampler provided herein applies equally to additional embodiments implemented within simplified computing devices or within digital still or video cameras.

2.1 System Overview:

In general, a "Joint Bilateral Upsampler," as described herein, operates to construct a high-resolution output signal and/or or a high-resolution solution set as a joint bilateral function of an original input signal and a low-resolution solution set derived from a downsampled and processed version of the original input signal.

In particular, unlike traditional bilateral filters which operate at a single resolution, the Joint Bilateral Upsampler described herein operates as a joint bilateral function of a distance measure (spatial filter) between data points of a low-resolution solution set, and a difference (range filter) between data points of the original high-resolution input signal. As such, the Joint Bilateral Upsampler operates at two different resolutions to construct a high-resolution solution set. The resulting high-resolution solution is then either saved for later use, or applied to the original high-resolution input signal to produce a high-resolution output signal.

For example, in the case of image files, the Joint Bilateral Upsampler generally operates by first downsampling one or more high-resolution input images (depending upon the problem to be solved), then processing the downsampled image or images to provide the desired low-resolution solution set for problems such as, for example, tone mapping, colorization, stereo depth, photomontage, etc. Once the low-resolution solution set is available, the Joint Bilateral Upsampler then constructs a high-resolution solution set as a joint bilateral function of the low-resolution solution set and the original input image.

Figure 4:
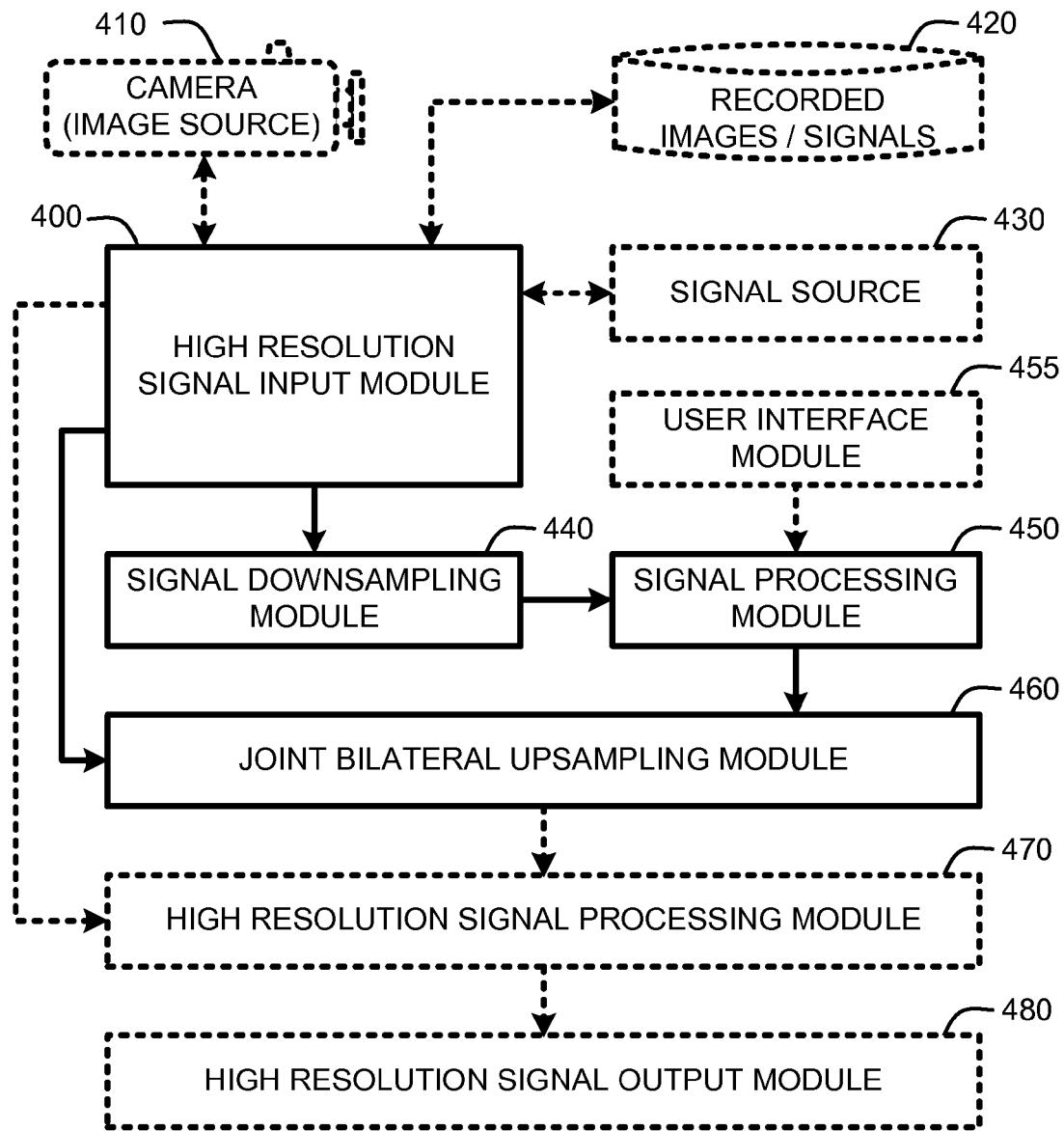
FIG. 4 provides an exemplary architectural flow diagram that illustrates program modules for implementing a Joint Bilateral Upsampler, as described herein.

2.2 System Architectural Overview:

The processes summarized above are illustrated by the general system diagram of FIG. 4. In particular, the system diagram of FIG. 4 illustrates the interrelationships between program modules for implementing the Joint Bilateral Upsampler, as described herein. It should be noted that any boxes and interconnections between boxes that are represented by broken or dashed lines in FIG. 4 represent alternate embodiments of the Joint Bilateral Upsampler described herein, and that any or all of these alternate embodiments, as described below, may be used in combination with other alternate embodiments that are described throughout this document.

In general, as illustrated by FIG. 4, the Joint Bilateral Upsampler begins operation by using a high-resolution signal input module 400 to receive one or more high-resolution signals from any of a plurality of input sources. For example, depending upon the signal type, the various signal sources include a digital still or video camera 410, previously recorded signals 420, or other signal sources 430. Note that for purposes of explanation, the remainder of the discussion in this section will assume that the input signal is an image.

Once the high-resolution signal input module 400 has received a high-resolution image, it provides that image to a signal downsampling module 440 which downsamples the high-resolution image to a lower resolution image that has a low enough resolution to be processed using available computing power and memory. Note that the concept of signal downsampling is well known to those skilled in the art, and will not be described in detail herein.

Once the signal downsampling module 440 has produced the downsampled low-resolution image, that low-resolution image is provided to a signal processing module 450 for further processing. In particular, depending upon the problem being solved, the signal processing module 450 will perform different tasks. For example, in the case of a tone mapping problem, the signal processing module 450 will process the low-resolution image to produce a corresponding low-resolution exposure solution set. Similarly, in the case of a 3D mesh, assuming an illumination problem, the signal processing module 450 will construct a low-resolution global illumination model from a low-resolution version (downsampled) of the original high-resolution 3D mesh. It should be noted that processing low-resolution signals to produce a low-resolution solution set (exposure, chromaticity, disparity, labels, illumination models, etc.) is known to those skilled in the art, and will be only generally discussed herein. Further, in another embodiment, the Joint Bilateral Upsampler includes a user interface module 455 for interacting with various features of the Joint Bilateral Upsampler. For example, depending upon the operations being performed by the Joint Bilateral Upsampler, the user interface module 455 can be used for selecting particular images or pixels, specifying exposure levels, adjusting chromaticity, etc.

Next, the signal processing module 450 provides the low-resolution solution set to a joint bilateral upsampling module 460. In addition, the joint bilateral upsampling module 460 also receives a copy of the original high-resolution input signal from the high-resolution signal input module 400. Given the low-resolution solution set and the original high-resolution input signal, the joint bilateral upsampling module 460 constructs a high-resolution solution set as a joint bilateral function of a distance measure (spatial filter) between data points of the low-resolution solution set, and a difference (range filter) between data points of the original high-resolution input signal.

Note that the distance measure used by the joint bilateral upsampling module 460 depends on the type of data represented by the signal being processed, while the range represents a distance between the data values. In particular, as described in further detail in Section 3 the basic idea here is that distance measures used by the spatial and range filters of the joint bilateral function are necessarily dependent upon the dimensionality of the input signal. However, any conventional distance measures (Minkowski, Euclidean, Mahalanobis, chord, geodesic, etc.) that are appropriate for a particular signal dimensionality can be used, as desired.

Once the joint bilateral upsampling module 460 has constructed the high-resolution solution set, that solution set is either saved for later use or applied to the original input signal to produce a high-resolution output signal. In particular, in the case where the high-resolution solution set is applied to the original input image, the joint bilateral upsampling module 460 provides the high-resolution solution set to a high-resolution signal processing module 470 which applies the high-resolution solution set to a copy of the original high-resolution input image provided by the high-resolution signal input module 400. The resulting high-resolution output signal is a processed version of the original input signal that is provided for storage and/or display via a high-resolution signal output module 480.

3.0 Operation Overview:

The above-described program modules are employed for implementing the Joint Bilateral Upsampler. As summarized above, the Joint Bilateral Upsampler provides a technique for constructing a high-resolution output signal and/or or a high-resolution solution set as a bilateral function of an original input signal and a low-resolution solution set derived from a downsampled version of the original input signal. The following sections provide a detailed discussion of the operation of the Joint Bilateral Upsampler, and of exemplary methods for implementing the program modules described in Section 2 with respect to FIG. 4.

3.1 Operational Details of the Joint Bilateral Upsampler:

The following paragraphs detail specific operational and alternate embodiments of the Joint Bilateral Upsampler described herein. In particular, the following paragraphs describe details of the Joint Bilateral Upsampler operation, including conventional bilateral filters; joint bilateral upsampling; and examples of various applications of the Joint Bilateral Upsampler.

3.2 Conventional Bilateral Filters:

As is well known to those skilled in the art, conventional bilateral filters are generally edge-preserving filters that are related to broader class of nonlinear filters such as anisotropic diffusion filters. Typical bilateral filters use both a spatial (or domain) filter kernel (such as, for example, a truncated Gaussian or other distribution) and a range filter kernel evaluated on the data values themselves.

For example, in the case of a 2D signal such as an image, for each pixel position p in the image, a conventional bilateral filter will provide a filtered result $J_p$, as illustrated by Equation 1, where:

$$J_p = \frac{1}{k_p} \sum_{q \in \Omega} I_q f(\|p - q\|) g(\|I_p - I_q\|) \qquad \text{Equation 1}$$

where f is a spatial filter kernel, such as, for example a Gaussian, or some other desired distribution, centered over p, and g is a range filter kernel centered at the image value $I_p$.

Further, $\Omega$ in Equation 1 represents the nonzero footprint of the kernel f, and $k_p$ is a normalizing factor which represents the sum of the f·g filter weights. Edges are preserved since the bilateral filter f·g takes on small values for points with large differences in value (e.g., $\|I_p-I_q\|$) as well as at some spatial distance away (e.g., $\|I_p-I_q\|$). As is well known to those skilled in the art, these types of filters are used for many applications, such as, for example, HDR tone mapping.

Related conventional bilateral filtering techniques have introduced the use cross bilateral filters in which the range filter is applied to a second image, $I_2$ having the same resolution as a first image $I_1$. For example, when trying to combine (or cross) high frequencies of the first image, $I_1$, and low frequencies of the second image, $I_2$, for each pixel position p in the first image, a conventional cross bilateral filter will provide a filtered result $J_p$, as illustrated by Equation 2, where:

$$J_p = \frac{1}{k_p} \sum_{q \in \Omega} I_{1q} f(\|p - q\|) g(\|I_{2p} - I_{2q}\|) \qquad \text{Equation 2}$$

3.3 Joint Bilateral Upsampling:

In contrast to the use of conventional bilateral filters, as discussed in Section 3.2, the Joint Bilateral Upsampler described herein provides a novel bilateral filter that operates on two different resolutions to directly address the problem of upsampling. In particular, unlike traditional bilateral filters which operate at a single resolution, the Joint Bilateral Upsampler described herein operates as a joint bilateral function of a distance measure (spatial filter) between data points of a low-resolution solution set, and a difference (range filter) between data points of the original high-resolution input signal. As such, the Joint Bilateral Upsampler operates at two different resolutions to construct a high-resolution solution set.

Note that the distance measure used by the Joint Bilateral Upsampler depends on the type of data represented by the signal being processed, while the range represents a distance between the data values of that signal. For example in the case of an image, the distance measure of the spatial filter will represent a distance between pixel locations (p and q) corresponding to the low-resolution solution set, while the range filter is evaluated on the distance (or difference) between pixel data values in the high-resolution input image.

On the other hand, when using signal types other than images, different distance measures may be used. For example, in the case of a 3D triangular mesh representing a 3D model or a scanned 3D object, the distance measure of the spatial filter would be determined as a geodesic distance rather than as a linear distance in the case of an image. Similarly, the distances of the range filter would be evaluated over a sphere rather than over a plane in the case of an image. In other words, the basic idea here is that distance measures used by the spatial and range filters of the joint bilateral function are necessarily dependent upon the dimensionality of the input signal. However, any conventional distance measures (Minkowski, Euclidean, Mahalanobis, chord, geodesic, etc.) that are appropriate for a particular signal dimensionality can be used, as desired.

One of the advantages of having the availability of the original high-resolution image (or other high-resolution signal) is that it provides additional information for use in guiding the interpolation of the low-resolution solution set from low to high-resolution. In particular, given a high-resolution input image, $\tilde{I}$ and a low-resolution solution, S, computed for a downsampled version of the image, $\tilde{I}$, the Joint Bilateral Upsampler provides a simple yet novel technique for upsampling the low-resolution solution.

Specifically, the general idea is to apply a spatial filter $f(\cdot)$ (such as, for example, a truncated Gaussian or other distribution) to the low-resolution solution, S, jointly with a similar range filter $g(\cdot)$ on the full resolution image, $\tilde{I}$. Thus, denoting p and q as the integer coordinates of pixels in $\tilde{I}$, and denoting p↓ and q↓ as the corresponding (possibly fractional) pixel coordinates in the low-resolution solution S. The upsampled solution $\tilde{S}$ is then obtained as illustrated by Equation 3, where:

$$\tilde{S}_p = \frac{1}{k_p} \sum_{q\downarrow \in \Omega} I_{q\downarrow} f(\|p\downarrow - q\downarrow\|) g(\|\tilde{I}_p - \tilde{I}_q\|) \quad \text{Equation 3}$$

As noted above, the output of Equation 3 is a high-resolution solution set that is either saved for later use, or applied to the original high-resolution input signal. However, it should also be noted that in various embodiments, further upsampling or downsampling of either the combination of the original high-resolution input signal and the high-resolution signal set, or the high-resolution output signal is enabled in order to achieve a desired final resolution for either the final high-resolution output signal or the high-resolution solution set.

3.4 Example Applications of the Joint Bilateral Upsampler:

In general, as noted above, the Joint Bilateral Upsampler operates on various signal types of various dimensionality with respect to various processing applications to construct a high-resolution output signal and/or or a high-resolution solution set as a bilateral function of the original input signal and a low-resolution solution set derived from a downsampled version of the original input signal. The following paragraphs illustrate various examples of a few of the many applications enabled by the Joint Bilateral Upsampler.

3.4.1 Tone Mapping:

High Dynamic Range (HDR) imaging is becoming increasingly popular, and as such, a number of techniques have been developed to provide tone mapping methods for displaying HDR images on typical display devices. Many of these conventional tone mapping methods produce high-quality results. However, those methods that provide high-quality results typically require solving a very large system of linear equations that is both computationally and memory intensive.

In general, tone mapping is a concept that is well understood by those skilled in the art, and will not be described in detail herein. However, the use of upsampled tone mapping solution sets generated by the Joint Bilateral Upsampler provides a computationally efficient technique for construction of high-resolution tone mapping solutions from a low-resolution tone mapping solution. In particular, the Joint Bilateral Upsampler addresses the tone mapping problem as discussed in the following paragraphs.

Specifically, let I represent a low-resolution HDR image (downsampled from the original high-resolution HDR image, $\tilde{I}$, and let T(I) represent the low-resolution tone mapped image produced by some conventional tone mapping process or operator, T. The corresponding low-resolution tone mapping solution is then defined as the pixelwise quotient, S=T(I)/I. In other words, the solution is an exposure map, which defines the amount of exposure correction to be applied at each pixel. As is known to those skilled in the art, such exposure maps are generally smooth but may have discontinuities which correspond to image edges. Consequently, tone mapping solutions are ideal candidates for the upsampling technique provided by the Joint Bilateral Upsampler.

In particular, since the low-resolution solution, S, is known (i.e., S=T(I)/I), and the original high-resolution HDR image, $\tilde{I}$, is also known, then a high-resolution tone mapping solution, $\tilde{S}$, is simply computed using Equation 3 in combination with appropriate spatial and range filters, f and g, respectively. This high-resolution tone mapping solution can then be applied to the original high-resolution HDR image, $\tilde{I}$, to produce a high-resolution tone mapped output image $\tilde{O}$.

3.4.2 Colorization:

In general, a similar linear system to that in the tone mapping problem arises in a number of conventional colorization and re-coloring methods. Although these systems are sparse and may be solved efficiently using conventional multi-resolution solvers, handling very large images (multi-megapixel or higher) is still a problem. Specifically, once the image pixel data exceeds the available physical memory, iteratively sweeping over the data results in thrashing. This problem also exists for some conventional colorization methods which do not require solving a linear system. Consequently, to avoid such memory problems with very large images, the original image is typically downsampled, and a colorization solution is computed over the low-resolution image. As with tone mapping, this provides an ideal candidate for the solution upsampling techniques provided by the Joint Bilateral Upsampler.

Note that as with tone mapping, colorization is another concept that is well understood by those skilled in the art, and will not be described in detail herein. However, the use of upsampled colorization solution sets generated by the Joint Bilateral Upsampler provides a computationally efficient technique for construction of high-resolution colorization solutions from a low-resolution colorization solution. In particular, the Joint Bilateral Upsampler addresses the colorization problem as discussed in the following paragraphs.

In particular, to address the colorization problem, the Joint Bilateral Upsampler converts the output of the colorization algorithms into the YIQ color space (or to any other desired color space separating luminance (Y) from the two chrominance channels (I and Q)). In other words, the low-resolution colorization solution set is split using conventional techniques to provide into two separate chrominance solution sets. Then, since two separate low-resolution solution sets are available along with the original high resolution image to be colorized, the Joint Bilateral Upsampler separately applies the upsampling techniques described with respect to Equation 3 to each of the two chrominance channels to produce two high resolution chrominance solutions. The resulting high-resolution chrominance solutions are then recombined to produce a single high-resolution colorization solution which is then applied to the original high resolution image to be colorized.

3.4.3 Depth from Stereo:

Stereo matching is a conventional and well known task in image analysis. In general, the idea of stereo matching is to determine the disparities between pairs of corresponding pixels in two or more images. There are many conventional approaches to stereo matching. In many of the conventional stereo matching methods, the original images are downsampled, then an optimization problem of some sort is solved over the downsampled images, yielding a piecewise continuous disparity field over each entire image. Low-resolution depth maps produced from such techniques are ideal candidates for the upsampling techniques provided by the Joint Bilateral Upsampler.

In particular, depth maps are typically rather smooth, with discontinuities that generally correspond to edges in the image. As such, low-resolution depth maps are treated like any other low-resolution solution set. Specifically, as with the tone mapping and colorization applications described above, the upsampling techniques described with respect to Equation 3 are applied to each low-resolution depth map in combination with the corresponding original high-resolution image. The result is a set of high-resolution depth maps which are then used as desired.

3.4.4 Graph-Cut Based Image Operations:

A number of conventional image editing techniques involve finding minimal cuts in graphs. Such techniques are typically referred to as "graph-cut" optimization. Graph-cut optimization techniques are often used in digital photomontage systems and other image stitching systems to compute the least objectionable seams when fusing together several pre-aligned partially overlapping images. The result of the optimization is a "label map," indicating for each pixel in the composite which photograph it originates from. Note that graph-cut techniques are well known to those skilled in the art, and will not be described in detail herein.

With respect to image stitching applications, the Joint Bilateral Upsampler again provides upsampling capabilities to reduce computational overhead and memory requirements. In this case, the low-resolution label map is low-resolution solution that is upsampled.

In particular, with image stitching, a number of pixels are constrained (either automatically or as specified by a user) to come from a particular input image. The conventional stitching algorithm then computes a label map, which assigns a label to each of the remaining unconstrained pixels, such that the seams in the final stitched image will be least conspicuous.

In this case, the label map differs from the solution sets described above (e.g., tone mapping, colorization, etc.) because the label map solution is a quantized solution (a discrete number of labels), rather than a continuous one. Furthermore, in this case there are multiple full resolution images. Consequently, the Joint Bilateral Upsampler addresses the upsampling of the label map is a somewhat different way. Specifically, to compute the label, L, for a particular pixel, each neighboring pixel with a nonzero bilateral weight votes for its label. Then, the winning label assigned to the high resolution label map, $\tilde{L}_p$, is the one that has aggregated the highest total weight. In other words, to address this particular case where there are N full resolution images, each pixel will have one of N possible labels, L. Therefore, $\tilde{S}_p$, as defined by Equation 3, is computed N times, once for each possible label for p to construct $\tilde{L}_p$. However, unlike the original range distance between the pixels at locations p and q defined in Equation 3, i.e., $\|p\downarrow -q\downarrow\|$, to compute the label map $\tilde{L}_p$, each $\tilde{S}_p$ (computed N times) is instead computed by defining the range distance as either 0 (match) or 1 (no match), depending on whether the label L(p) for the pixel at position p matches the label L(q) for the pixel at position q. Then, the highest of the N possible $\tilde{S}_p$ is used to define the high resolution label map, $\tilde{L}_p$.

Figure 5:
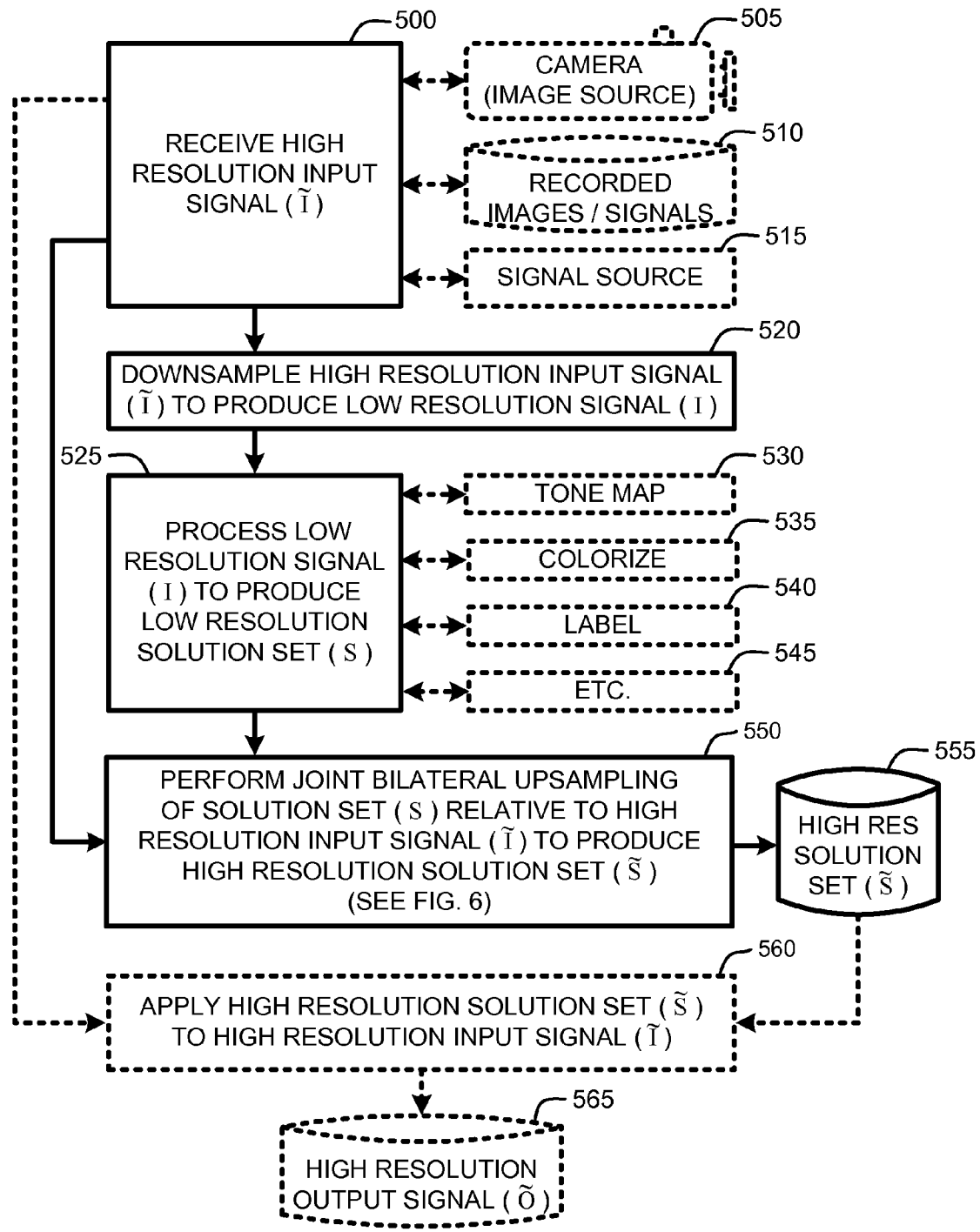
FIG. 5 provides an exemplary system flow diagram that illustrates exemplary methods for implementing a Joint Bilateral Upsampler, as described herein.
Figure 6:
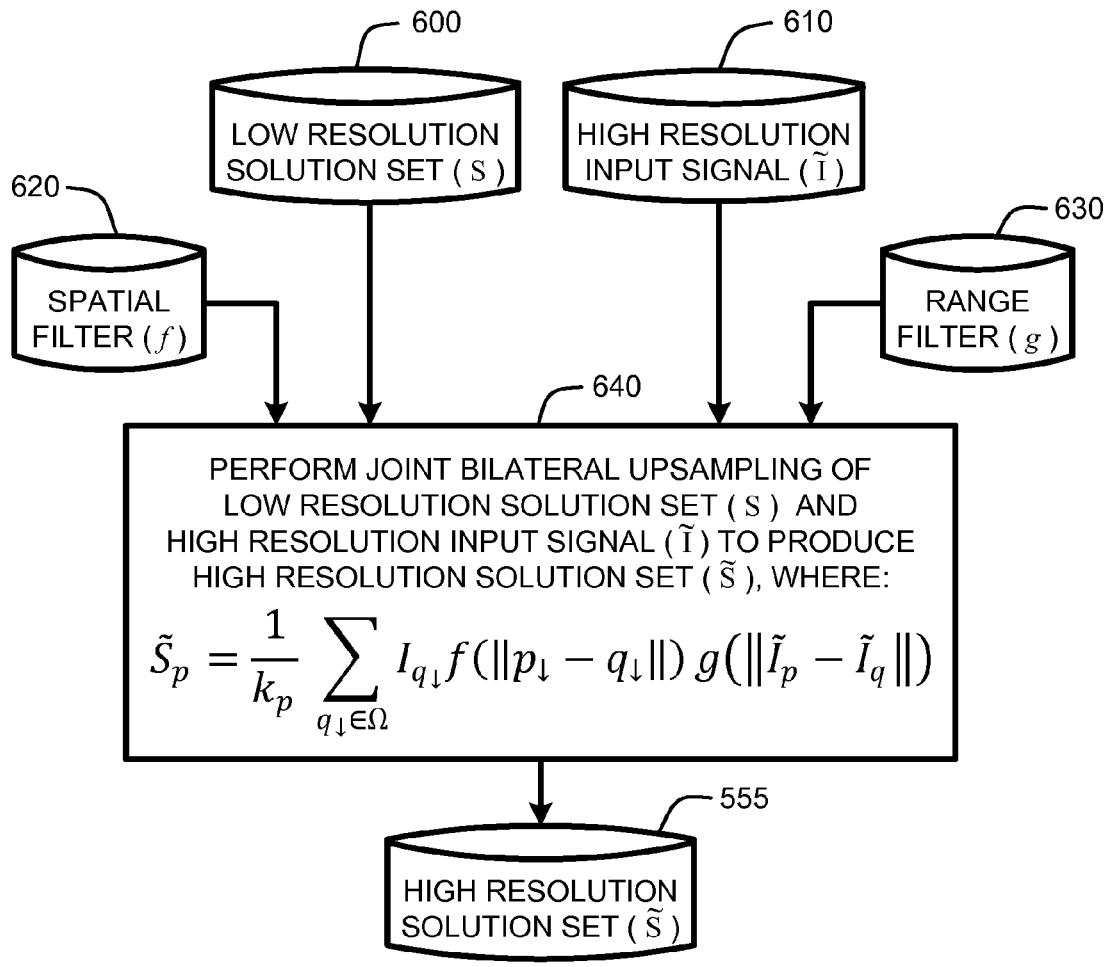
FIG. 6 provides an exemplary system flow diagram that illustrates exemplary methods for computing a high-resolution solution set from a low-resolution solution set based on a joint bilateral upsampling of the low-resolution solution set in combination with a high-resolution input signal, as described herein.

4.0 Operation:

The processes described above with respect to FIG. 4, and in further view of the detailed description provided in Sections 2 and 3 are illustrated by the general operational flow diagrams of FIGS. 5 and 6. In particular, FIG. 5 provides an exemplary operational flow diagram which illustrates operation of several embodiments of the Joint Bilateral Upsampler. Similarly, FIG. 6 illustrates one embodiment for computing a high-resolution solution set from a low-resolution solution set based on a joint bilateral upsampling of the low-resolution solution set in combination with a high-resolution input signal.

It should be noted that any boxes and interconnections between boxes that are represented by broken or dashed lines in FIG. 5 represent alternate embodiments of the Joint Bilateral Upsampler described herein, and that any or all of these alternate embodiments, as described below, may be used in combination with other alternate embodiments that are described throughout this document.

In general, as illustrated by FIG. 5, the Joint Bilateral Upsampler begins operation by receiving 500 one or more high-resolution signals, $\tilde{I}$, from any of a plurality of signal input sources. For example, depending upon the signal type, the various signal sources include a digital still or video camera 505, previously recorded images or signals 510, or high resolution signals from other conventional signal sources 515. Note that for purposes of explanation, the remainder of the discussion in this section will assume that the input signal is an image.

The high-resolution image, $\tilde{I}$, is then downsampled 520 to a lower resolution image, I, that has a low enough resolution to be processed using available computing power and memory. The downsampled image, I, is then processed 525 to produce a low-resolution solution set, S. As discussed above, such processing 525 includes conventional techniques such as, for example, tone mapping 530, colorization 535, label maps 540, or any other desired processing technique 545 for producing a low-resolution set from a downsampled version of the original high-resolution signal.

Next, given the low-resolution set, S, and the original high-resolution input image, $\tilde{I}$, the Joint Bilateral Upsampler constructs a high-resolution solution set, $\tilde{S}$, as a joint bilateral function between the data points of the low-resolution solution set, S, and the data points of the original high-resolution input signal, $\tilde{I}$, as described above with respect to Equation 3. In particular, as illustrated by FIG. 6, the Joint Bilateral Upsampler receives: 2) a copy of the low-resolution set, S, 600; 1) a copy of the original high-resolution input signal, $\tilde{I}$, 600; 3) a spatial filter, f, 620; and 4) a range filter, g, 630. These four inputs are then used to perform 640 a joint bilateral upsampling of the low-resolution set, S, and the high-resolution input signal, Ĩ, to produce the high resolution solution set, S̃, 555 in accordance with Equation 3.

Finally, referring back to FIG. 5, the resulting high-resolution set, S̃, 555 is then either stored for later use, or applied 560 to the original high-resolution input signal to produce a high-resolution output signal, Õ, 565.

The foregoing description of the Joint Bilateral Upsampler has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Joint Bilateral Upsampler. It is intended that the scope of the invention be limited not by this detailed description, but rather by the claims appended hereto.

The invention claimed is:

1. A method for upsampling a solution set, comprising using a computing device to:
   perform steps for:
   receiving a high-resolution input signal having a first resolution;
   receiving a low-resolution solution set computed from a downsampled version of the high-resolution signal, said low-resolution solution set having a second resolution lower than the first resolution;
   performing a joint bilateral upsampling using the low-resolution solution set and the high-resolution signal to generate a high-resolution solution set having a resolution equivalent to the first resolution; and
   storing the high resolution solution set for later use by a user.

2. The method of claim 1 wherein the input signal is an image.

3. The method claim 2 wherein the low-resolution solution set represents an exposure solution for tone mapping the input image.

4. The method claim 2 wherein the low-resolution solution set represents a pair of chromaticity solutions for colorizing the input image.

5. The method claim 2 wherein the low-resolution solution set represents a disparity solution computing depth map from two or more input images.

6. The method claim 2 wherein the low-resolution solution set represents a label map solution of a graph-cut optimization.

7. The method of claim 1 wherein the input signal is a 3D triangular mesh representing a 3D object model, and wherein the low-resolution solution set represents a global illumination model for the 3D object model.

8. The system of claim 1 further comprising processing the high-resolution input signal using the high-resolution solution set to produce a high-resolution output signal.

9. A physical computer-readable storage device having computer executable instructions stored therein for generating a high-resolution output signal from a high-resolution input signal, said computer executable instructions comprising:
   receiving a high-resolution input signal;
   downsampling the input signal to produce a downsampled signal;
   processing the downsampled signal to generate a low-resolution signal solution;
   performing a joint bilateral filtering of the low-resolution signal solution and the high-resolution input signal to generate a high-resolution signal solution; and
   applying the high-resolution signal solution to the high-resolution input signal to generate a high resolution output signal.

10. The computer-readable storage device of claim 9 wherein the high-resolution input signal is at least one image.

11. The computer-readable storage device of claim 10 wherein the low-resolution signal solution represents an exposure solution for tone mapping the input image.

12. The computer-readable storage device of claim 10 wherein the low-resolution signal solution represents a pair of chromaticity solutions for colorizing the input image.

13. The computer-readable storage device of claim 10 wherein the low-resolution signal solution represents a disparity solution computing depth map from two or more input images.

14. The computer-readable storage device of claim 10 wherein the low-resolution signal solution represents a label map solution of a graph-cut optimization.

15. The computer-readable storage device of claim 10 wherein the input signal is a 3D triangular mesh representing a 3D object model, and wherein the low-resolution signal solution represents a global illumination model for the 3D object model.

16. A camera for processing images in near real-time, comprising using a computing device embedded within the camera for:
   capturing a high-resolution input image;
   downsampling the input image;
   processing the downsampled input image to generate a low-resolution image solution;
   performing a joint bilateral filtering of the low-resolution image solution relative to the high-resolution input image to generate a high-resolution image solution; and
   applying the high-resolution image solution to the high-resolution input image to generate a high-resolution output image.

17. The camera of claim 16 wherein the low-resolution image solution represents an exposure solution for tone mapping the input image.

18. The camera of claim 16 wherein the low-resolution image solution represents a pair of chromaticity solutions for colorizing the input image.

19. The camera of claim 16 wherein the low-resolution image solution represents a disparity solution computing depth map from two or more input images.

20. The camera of claim 16 wherein the low-resolution image solution represents a label map solution of a graph-cut optimization.

* * * * *